Figure 1:
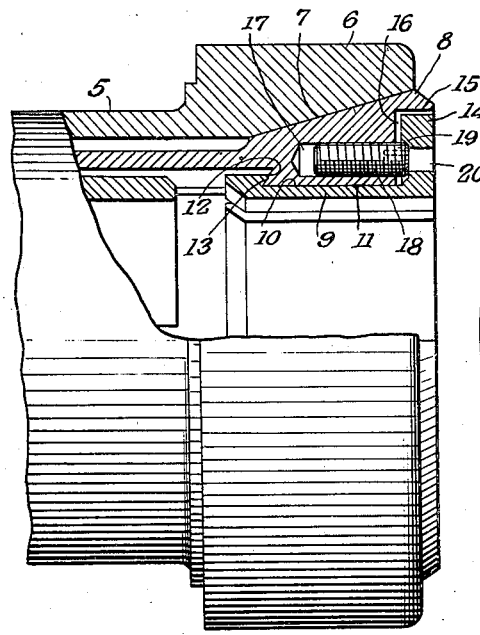

Nov. 4, 1941.     F. J. BECHERT     2,261,899
COLLET
Filed April 6, 1939

INVENTOR
FRED J. BECHERT
BY
ATTORNEYS.

Patented Nov. 4, 1941

2,261,899

UNITED STATES PATENT OFFICE 2,261,899

COLLET

Fred J. Bechert, Stamford, Conn., assignor to The New Britain Machine Company, New Britain, Conn., a corporation of Connecticut Application April 6, 1939, Serial No. 266,259

2 Claims. (Cl. 279—46)

My invention relates to a chucking means and more particularly to an improved form of collet and pad.

It is now common practice to insert false jaws or pads in a collet and the commonest method for holding the pads in place is by means of screws extending radially through the collet jaws and into the pads. In order to change pads when so held in place it is necessary to move the collet out of its seat in order to render the screws accessible. Other means for holding pads which have been proposed involve the use of screws or other holding means, accessible from the front of the collet to avoid the necessity of backing the collet out of its seat for pad changing. Devices of that sort are subject to the objection that the holding screws may be accidentally backed out and lost or in some cases interfere with the tools working adjacent to the collet.

It is an object of my invention to overcome the above difficulties and, in general, to provide an improved form of collet and pad.

A more specific object is to provide a collet and pad with means for holding the latter in place and positively preventing the same from working loose when the pads are assembled with the collet jaws.

Another object is to provide an improved form of collet and pads, relatively simple and cheap to manufacture and effective in use.

Other objects and various features of invention will be hereinafter pointed out or will become apparent to those skilled in the art.

In the drawings which show, for illustrative purposes only, a preferred form of the invention—

Figure 2:
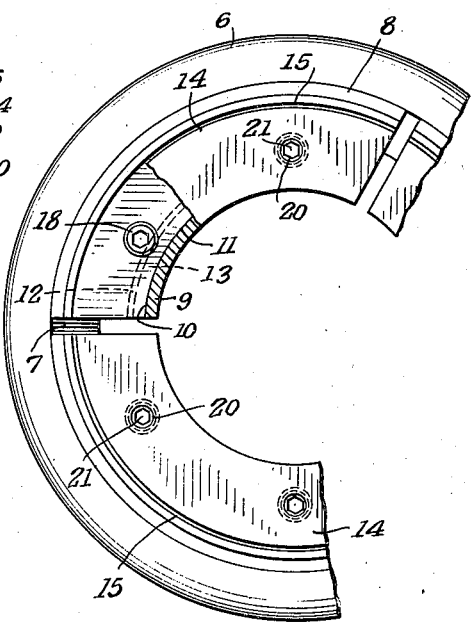

Fig. 1 is a side view of a collet, parts being shown in central vertical section to illustrate features of the invention; and Fig. 2 is a fragmentary front view of the collet and other parts shown in Fig. 1.

The invention will be described as embodied in a draw-back type of collet, though in its broader aspects the invention is not so limited. The collet may be carried by means such as a rotating spindle 5, having a spindle nose 6 with a rearwardly inclined or conical collet seat 7. The collet includes a plurality of jaws 8—8, three being shown, which jaws have outer surfaces to fit the seat 7, so that when the collet is drawn axially rearwardly or to the left as viewed in Fig. 1 the jaws will move in radially, to grip the bar stock or other work, all as is now common practice and will be understood.

The collet jaws 8—8 are provided with false jaws or pads 9—9. In the form shown each jaw has a cylindrical seating surface 10 extending from front to rear, and each pad 9 has a corresponding cylindrical seating surface 11 extending from front to rear, so as to limit the outward radial movement of the pads in the jaws. Each jaw has a generally radially outwardly extending abutment surface or shoulder 12 and each pad at the rear has a corresponding surface or shoulder 13 to abut the surface 12. These surfaces 12—13 are preferably slightly inclined so that when the pad 9 is drawn toward the right the inclined surfaces 12—13 tend to urge or cam the pads radially outwardly into engagement with the jaws.

The pads are secured in place by improved means interposed between the jaws and pads accessible from the front and held by the jaws and pads themselves against loss or dislodgment when the parts are assembled. In the form illustrated each jaw has a generally radially outwardly extending flange or part 14, which may fit into a counterbore 15 in the front of the jaws. There is a space 16 between the rear of the part 14 and the bottom of the counterbore 15, so that the pad may be moved toward the left to disengage surfaces 12—13 so the pads may be dropped radially inwardly for removal. In the preferred form one of the jaw and pad members carries means engageable with the other and prevented from dislodgment by engagement with one of the parts. As illustrated, each jaw is provided with one or more threaded bores 17, preferably extending generally longitudinally inwardly. A threaded member 18, preferably in the form of a so called headless set screw, is threaded into the bore 17 and extends outwardly into engagement with the rear portion of the flange part 14. The latter preferably has a generally countersunk recess 19 in the rear face thereof and the screw 18 is preferably chamfered off for engagement with the upper portion of the countersink 19, so that when the screw 18 is backed out, that is, moved toward the right, the entire pad will be urged toward the right and the chamfered end of the set screw will also urge the pad radially outward at the front end. The member not carrying the set screw, in this case the pad, is provided with an opening, say in the form of a hole 20, in general alignment with the set screw 18, and the latter is provided with a depressed wrench socket 21 for receiving a wrench inserted through the hole 20, whereby the screw may be actuated.

When it is desired to remove the pad a wrench is inserted and the screw 18 turned into the bore 17, after which the pad may be moved toward the left to disengage the surfaces 12—13 and permit the pad to drop radially inwardly for removal. A new pad may then be applied by first engaging the surfaces 12—13 and then by means of a wrench backing the set screw 18 outwardly in its bore 17, so as to cause engagement of the forward end of the screw with the rear portion of the flange part 14. It will be seen that so long as the pads are in place on the jaws the screws 18 cannot become dislodged and lost nor can they project axially outwardly beyond the face of the jaws. Therefore, there is no possibility of losing the screws nor possibility of their interference with tools acting adjacent to the front of the collet. Instead of employing the countersink 19 the rear part of the flange may be inclined radially outwardly and rearwardly and the screw 18 may be screwed into a bore inclined to the axis of the collet, so as to urge the pad toward the right and radially outwardly, as will be understood.

By reason of my invention the manufacture of the jaws and pads is somewhat simplified. The only surfaces, with the possible exception of the surfaces 12—13 and the stock gripping surfaces, which need grinding or other accurate finishing are the surfaces 10—11, and those surfaces are of a uniform diameter and continuous from end to end, that is to say, the finishing of the surface 10 is a simple bore grinding operation and the finishing of the surface 11 is an equally simple operation. The grinding or finishing of the surface 12 on each jaw is greatly facilitated by reason of the fact that the inside diameter of each jaw from the surface 12 to the rear of the jaw member and the inside diameter of the spring leg carrying the jaw are at least as great as the inside diameter of the jaw member at the base of the abutment surface 12.

While the invention has been described in considerable detail and a preferred form illustrated, it is to be understood that various changes may be made within the scope of the invention as defined in the appended claims.

I claim:

1. A collet having a plurality of spring jaws including tapered jaw members and spring legs rearwardly of said jaws, removable pads for said jaw members, said jaw members each having a generally radially extending undercut abutment surface toward the rear thereof, the inner diameter of each of said jaw members from said abutment surface to the rear end of said jaw members and the inner diameter of said spring legs being at least as great as the inner diameter of the jaw member at the base of said abutment, said pads having abutments to fit said abutment surfaces on said jaws, and means for holding said pads in place on said jaws.

2. A collet having a plurality of spring jaws including tapered jaw members and spring legs rearwardly of said jaws, removable pads for said jaw members, said jaw members each having a generally radially extending undercut abutment surface toward the rear thereof, the inner diameter of each of said jaw members from said abutment surface to the rear end of said jaw members and the inner diameter of said spring legs being at least as great as the inner diameter of the jaw member at the base of said abutment, each said jaw member having a longitudinally extending surface thereon forwardly of said undercut abutment surface, each said pad having an abutment to engage said abutment surface on said jaw member and having a longitudinally extending surface to fit the corresponding surface on said jaw member, each said pad having an outwardly directed flange thereon at the front, and a screw threaded in each jaw member and engaging the rear of said flange to hold the pad in place on the said jaw member.

FRED J. BECHERT.